June 19, 1962 A. LE BOUTILLIER ETAL 3,039,432
APPARATUS FOR TREATING A WORKPIECE WITH A LIQUID
Filed Aug. 25, 1959 2 Sheets-Sheet 2
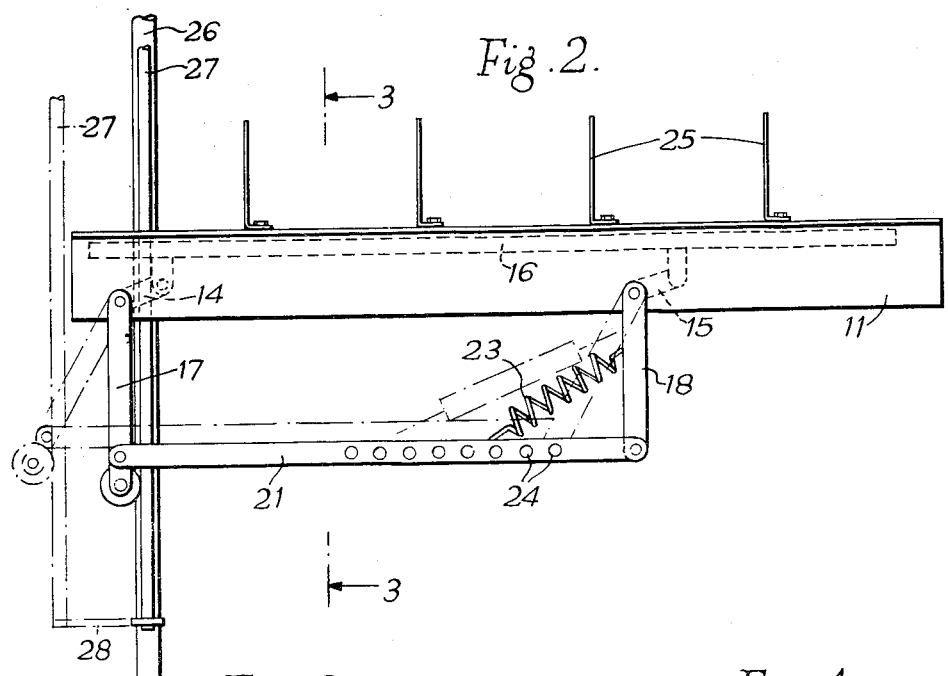
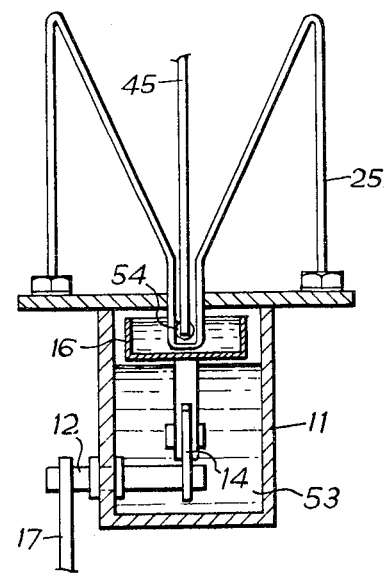
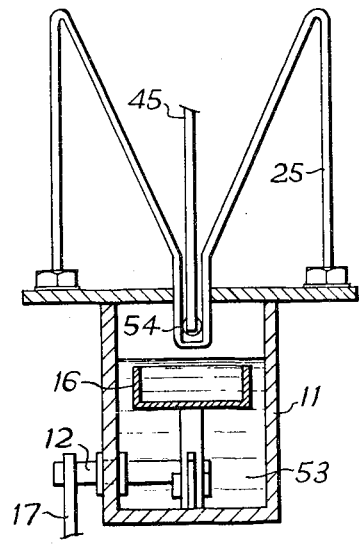
INVENTOR
Arthur Le Boutillier
Michael C. Stevens
BY
Ralph B. Stewart
ATTORNEY United States Patent Office 3,039,432
Patented June 19, 1962

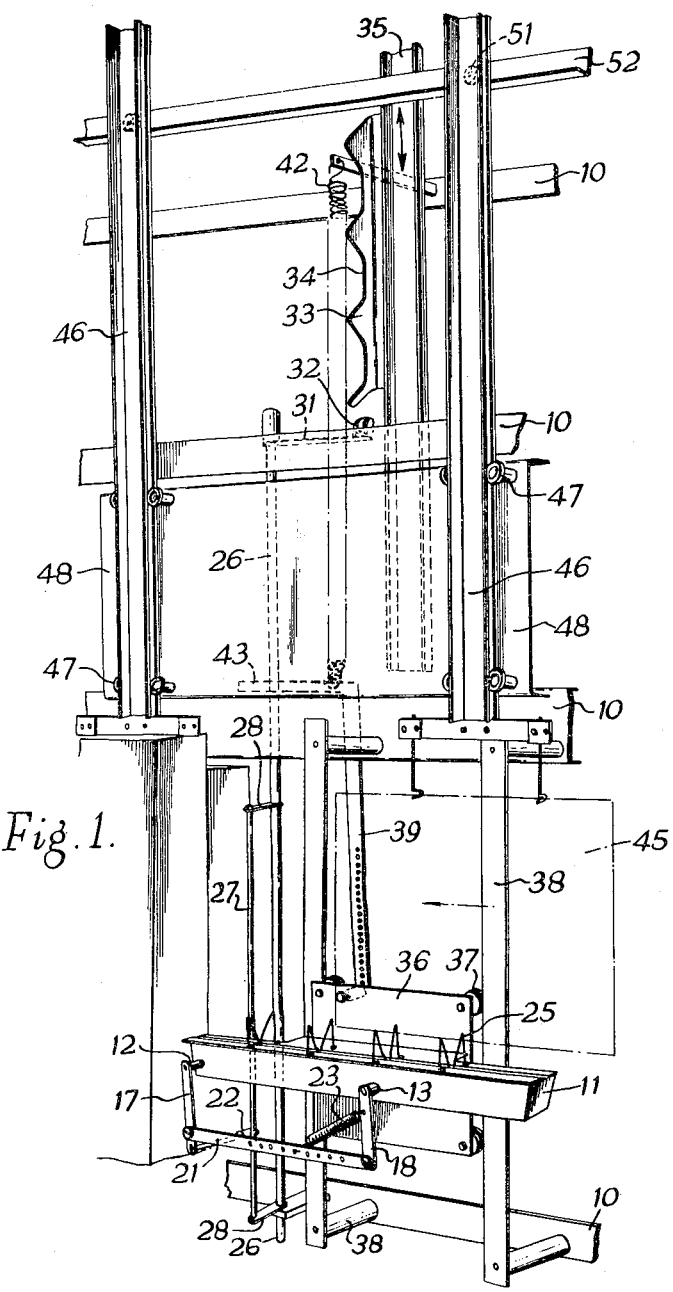

3,039,432
APPARATUS FOR TREATING A WORKPIECE
WITH A LIQUID
Arthur Le Boutillier and Michael Charles Stevens, London, England, assignors to A. C. Cossor Limited, London, England, a British company
Filed Aug. 25, 1959, Ser. No. 835,915
Claims priority, application Great Britain Sept. 1, 1958
3 Claims. (Cl. 118—421)

The present invention is concerned with apparatus for treating a workpiece with a liquid, and which is suitable for use at a station of a transfer machine, that is, a machine in which a workpiece is moved from one station where a manufacturing operation is performed upon it to the next such station.

According to the present invention there is provided an apparatus for treating a workpiece wtih a liquid, the apparatus comprising an outer trough for containing liquid, and an inner trough for containing liquid, the inner trough being supported by supporting means adapted to move the inner trough in a generally vertical direction between a relatively low position at which it is wholly within the said outer trough and a relatively high working position. The apparatus is such that, when the outer trough contains liquid in sufficient depth to cover the inner trough in its relatively low position, liquid can be carried by the inner trough when it is moved to its relatively high working position, at which position treatment of a workpiece can take place, and subsequently the used liquid in the inner trough may be partly replaced by the liquid which has remained in the outer trough by returning the inner trough to its relatively low position.

Movement of the inner trough in a generally vertical direction may be obtained by movement of the supporting means effected by actuating means situated outside the outer trough. The supporting means may be connected with the actuating means by a member which passes in liquid-tight manner through the structure of the outer trough such as its wall or bottom. The movement of the inner trough may have a considerable horizontal component. Thus, for example, the inner trough may be supported by the arm of at least one crank the rotatable shafts of which pass in liquid-tight manner through the side of the outer trough. In this case the actuating means should be adapted to turn the shaft, either in one direction through a complete revolution, or in a reciprocating manner, which may only cover part of a revolution.

Locating means may be provided to maintain a workpiece in a predetermined position where it will be partly or completely immersed in a liquid contained in the inner trough when the inner trough is in its relatively high working position. Such locating means may conveniently be mounted on the outer trough. The provision of locating means is preferable when an apparatus according to the invention is used at a station of a transfer machine, in order to ensure that a workpiece moved by the machine will take up a suitable position in which to be treated with liquid contained in the inner trough of the apparatus.

When such an apparatus is used at a station of a transfer machine, the workpiece may be lowered into the locating means by the machine, and the movement of the actuating means may be effected by a drive taken from the machine. Alternatively, the outer trough may itself be mounted in the transfer machine for movement in a vertical direction and so brought to a workpiece which has been moved into the station by a generally horizontal movement. In this case the actuating means is desirably adapted to be capable of effecting movement of the inner trough at all points of the vertical travel of the outer trough.

One embodiment of the invention will be described by way of example with reference to the accompanying drawings in which:

FIG. 1 is a perspective view of part of a transfer machine including apparatus according to the invention, FIG. 2 is a side elevation of the apparatus according to the invention which appears in FIG. 1, FIG. 3 is a vertical cross-section of the apparatus shown in FIG. 2 along the line 3—3 in FIG. 2, showing the inner trough in the high working position, and FIG. 4 is a sectional view corresponding to FIG. 3 but showing the inner trough in the low position.

The embodiment is described in use at a station of a transfer machine and may be used for the removal of a bead of soluble materal formed at the lower edge of a laminar workpiece which has been dip-coated in a solution of the material and dried while being maintained in a constant disposition relative to the vertical. Such a bead may be formed during the production of photo-printed circuits when a sheet of laminated material, to which metal foil has been bonded, is suspended in a vertical position while being dip-coated with a solution of a photoresist material and dried by hot air.

Inside a long and relatively deep outer trough 11 are mounted two cranks, the rotatable shafts 12 and 13 of which pass in liquid-tight manner through one side of the outer trough, the two cranks being mounted towards different ends of the outer trough and near its bottom. The arms 14 and 15 of the cranks are of equal length and are pivotally connected to a long relatively shallow inner trough 16. The arms 14 and 15 of the cranks are parallel, and when in a horizontal position, the inner trough 16 is horizontally situated in its low position, near the bottom of the outer trough 11. When the arms are vertical, the inner trough is situated in its high position, near the top of the outer trough. To the ends of two shafts 12 and 13, outside the outer trough, are fixed two drop arms 17 and 18 respectively. The drop arms are of equal length and are both pivotally connected to a horizontal link-bar 21, one end of which carries a roller 22.

A tension spring 23 is stretched between the arm 18 and the link-bar 21, a series of holes 24 permitting adjustment of the tension. On the upper edges of the outer trough 11 are mounted locating means comprising four stiff, vertical, M-shaped wires 25, bridging the top of the outer trough. The central V-shaped portion of each wire is of such dimensions that it reaches nearly to the bottom of the inner trough 16 when the inner trough is in its high position.

As is shown particularly in FIG. 1, this embodiment is mounted in a transfer machine having a main frame 10 in which is pivotally mounted a vertical shaft 26, to which a parallel rod 27 is fixed by upper and lower mounts 28. An arm 31 is fixed to the upper end of the shaft 26 and carries a cam follower 32 which is urged towards the rear of the machine as viewed in FIG. 1 owing to the action of the spring 23 in urging the roller 22 against the rod 27. A cam member 33 with a parallelogram profile and one saw-tooth edge 34 is mounted on a riser element 35 which is movable in both vertical directions by a drive (not shown) obtained from the transfer machine. When the riser 35 is lowered, the cam follower 32 passes behind the cam member 33, but when the riser is raised the follower is displaced forward and traverses the saw-tooth edge 34.

The outer trough 11 is carried by a trolley 36, which is vertically movable on wheels 37 running between rails 38 fixed to the frame 10 and which is supported by a bar 39 which can be fixed at a variety of points to the trolley 36. The bar 39 is suspended from a tension spring 42 the upper end of which is fixed to a member of the frame 10. A member 43 fixed to the top of the bar 39 can be depressed vertically by a motion (not shown) of the transfer machine analogous to that effecting movement of the riser 35.

In the transfer machine a part of which is shown in FIG. 1, laminar workpieces 45 are suspended from the lower end of holders 46. The holders are vertically movable between guide rollers 47 on a trolley 48, but at the part of the machine shown in FIG. 1 are suspended by rollers 51 running on fixed rails 52. The trolley 48 is linked to preceding and succeeding trolleys (not shown) and the workpieces are moved into and away from the station by horizontal movement of the train of trolleys, which runs on horizontal rails.

In operation, sufficient solvent 53 is placed in the outer trough 11 to completely cover the inner trough 16 when in its low position (as shown in FIG. 4). A laminar workpiece 45 having a bead 54 of solvent-soluble material along its lower edge is moved horizontally by movement of the trolley 48 until it is immediately above the outer trough 11 of the apparatus according to the invention, the trolley 36 being in the low position shown in FIG. 1 by depression of the member 43 against the spring 42. When the workpiece 45 is in position, movement of the trolley 48 ceases, downward pressure on the member 39 ceases and the trolley 36 rises under the influence of the spring 42 until the lower edge of the workpiece is guided by the wires 25 into the slot in the trough 16, and reaches the bottoms of the central V-shaped portions of the wires, as shown in FIG. 3.

Meanwhile, the riser 35 has been falling from the position shown in FIG. 1, the follower 32 passing behind it, and the inner trough 16 therefore taking up its high working position under the influence of the spring 23 (as shown in FIG. 3). By the time the workpiece is in position in the guide wires 25 with its lower edge and bead 54 dipping in the inner trough in its high position, the cam 33 has passed below the follower 32 and the movement of the riser 35 is reversed. The follower 32 is then moved forward and traverses the saw-tooth edge 34. This causes four successive lowerings of the inner trough 16 to the position shown in FIG. 4, during each of which lowerings part of the solvent contaminated by the material of the bead 54 is exchanged for fresh solvent from the outer trough. In addition, the movement causes agitation of the solvent in the inner trough which hastens the dissolution of the bead 54.

As the bottom of the cam 32 passes the follower 33 the downward pressure on the member 43 is renewed and the trolley 36 bearing the trough 11 is moved downwards, away from the workpiece 45. The workpiece can then be moved away along the machine by movement of the train of trolleys 48.

The use of the shaft 26, rod 27 and roller 22 to transmit the motion of the cam follower 32 to the link-bar 21 enables workpieces of different depths, within limits, to be treated in the same machine without adjustment, since the rod 27 can transmit the movement at any point along its length and the trough 11 is raised by the tension spring 42 and is only arrested by contact of the bottom of the workpiece with the bottom of the M-shaped guide wires 25. Beyond the limit of accommodation of the spring 42, workpieces of extreme depths can be accommodated by varying the position of fixing of the trolley 36 on the bar 39.

We claim:

1. Apparatus for treating a workpiece with a liquid comprising an outer trough for containing liquid, an inner trough for containing liquid, means supporting said inner trough and adapted to move said inner trough in a generally vertical direction between a relatively low position within said outer trough at which said inner trough can be filled with the liquid contained in said outer trough and a relatively high working position, and means for locating the workpiece in a predetermined position relative to said inner trough comprising at least one guide mounted on said outer trough and adapted to direct the workpiece into a position within said inner trough when said inner trough is in its high working position.

2. Apparatus for treating a workpiece with a liquid comprising an outer trough containing the liquid and having generally vertical walls, an inner trough for also containing the liquid, means supporting said inner trough for movement in a generally vertical direction between a relatively low position wholly within said outer trough at which said inner trough can be filled with the liquid contained in said outer trough and a relatively high working position, said means including at least one crank pivotally connected to said inner trough, a rotatable shaft connected to said crank and extending through the generally vertical walls of said outer trough in a fluid tight manner, and drive means for rotating said shaft.

3. Apparatus according to claim 2 wherein at least one guide is mounted on the outer trough and adapted to direct a workpiece into a position therein which is located within the inner through when the inner trough is in its high working position.

References Cited in the file of this patent

UNITED STATES PATENTS

| | | |
|---|---|---|
| 1,967,856 | Beckman | July 24, 1934 |
| 2,293,747 | Koch | Aug. 25, 1942 |
| 2,791,514 | Mears | May 7, 1957 |